(12) United States Patent
Drapkin et al.

(10) Patent No.: US 6,553,445 B1
(45) Date of Patent: Apr. 22, 2003

(54) METHOD AND APPARATUS FOR REDUCING NOISE ASSOCIATED WITH SWITCHED OUTPUTS

(75) Inventors: Oleg Drapkin, Richmond Hill (CA); Grigori Temkine, Toronto (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/498,586

(22) Filed: Feb. 4, 2000

(51) Int. Cl.[7] .......................... G06F 13/42; H03K 17/16
(52) U.S. Cl. ......................... 710/305; 710/106; 326/31
(58) Field of Search ........................ 710/305, 105–106; 326/21–34

(56) References Cited

U.S. PATENT DOCUMENTS

| | | | | |
|---|---|---|---|---|
| 4,667,337 A | * | 5/1987 | Fletcher | 326/21 |
| 5,890,005 A | * | 3/1999 | Lindholm | 377/41 |
| 6,208,177 B1 | * | 3/2001 | Knoedl, Jr. | 327/108 |
| 6,243,779 B1 | * | 6/2001 | Devanney et al. | 326/21 |

* cited by examiner

*Primary Examiner*—Sumati Lefkowitz
(74) *Attorney, Agent, or Firm*—Vedder, Price, Kaufman and Kammholz (57) ABSTRACT

A method and apparatus for simultaneously communicating data over a plurality of data links, such as a bus, determines initial logic levels of data to the output on each of the plurality of data links and changes the logic levels, such as inverting the data, of at least some of the data to produce logic level adjusted data in response to determining the initial logic level of the data to reduce switching transitions of simultaneously switched output data over the plurality of data links.

32 Claims, 5 Drawing Sheets

METHOD AND APPARATUS FOR REDUCING NOISE ASSOCIATED WITH SWITCHED OUTPUTS

FIELD OF THE INVENTION

The invention relates generally to methods and devices for providing simultaneously switched outputs for communication over a bus, and more particularly to devices and methods for reducing switching noise during simultaneous switching of the outputs from one logic level to another.

BACKGROUND OF THE INVENTION

Communicating data, such as command information, video data, audio data and any other suitable information, over a bus, such as a plurality of data links, among the plurality of circuits can be done in many ways. Fast interfaces are sometimes used between differing circuits, such as between different chips (using for example double data rate interfaces). A main problem with fast interfaces results from the fast interface using simultaneously switched outputs (SSO). Data is communicated over a bus in parallel fashion between differing circuits. Where the fast interfaces use simultaneously switched outputs, a large power and ground bounce can occur during simultaneous switching of many outputs from a logic level "0" to a logic level "1" (or from a logic "1" to a logic "0"). As a result, glitches, noise, signal skewing, clock skewing and other interface problems can occur.

Figure 1:
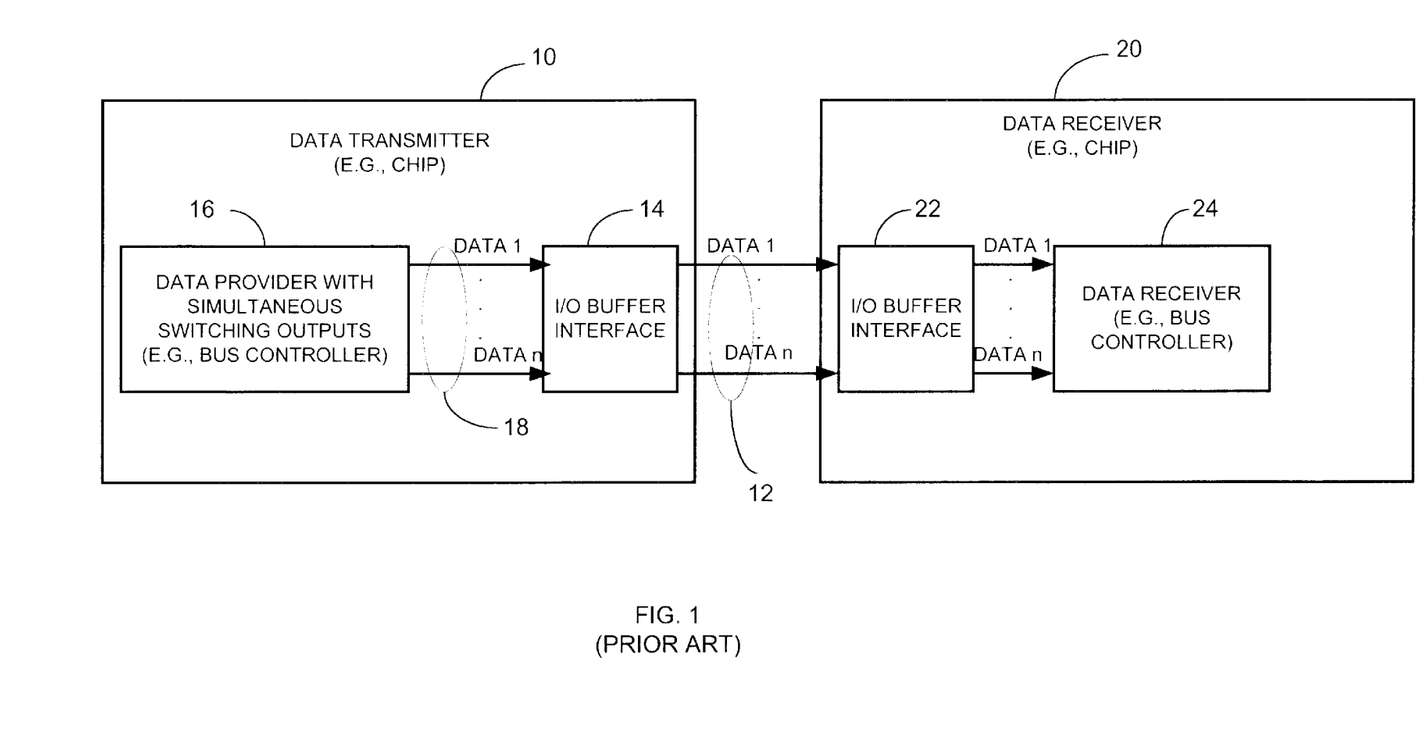
FIG. 1 is a block diagram illustrating a conventional apparatus using simultaneously switched outputs.

For example, as shown in FIG. 1, a data transmitter 10 may communicate data over data links 12 (e.g., a bus) using a fast interface, such as an I/O buffer interface 14. A data provider 16, such as a bus controller or any other suitable circuit, provides output of data in parallel over a bus 18 through simultaneous switching outputs as known in the art. The I/O buffer interface 14 also includes simultaneous switching outputs. A receiving circuit 20, such as another chip or any other suitable receiving circuit, includes a corresponding I/O buffer interface 22 that receives the communicated data over the data links 12. The data is then transferred to a data receiving circuit 24, such as a bus controller, or any other suitable device. Bidirectional data transfer is typically provided, although not shown. The I/O buffer interface 14 utilizes simultaneous switching outputs; the data links 12 may each include data at a logical "1" level and subsequently on the next cycle include data at the "0" level. The switching of all the data lines from one logic level to another or a subset of data lines from one logic level to another, can result in undesirable noise, glitches, signal skewing, and clock skewing.

Several suggested solutions include using a chip package with lower parasitic inductance, or decreasing output signal slew rates. However, small output signal slew rates typically decrease the working frequency of the chip making the chip unnecessarily slower than needed. In addition, low impedance circuits may still have simultaneously switched output problems at a higher working frequency.

Accordingly, there exists a need for a method and apparatus for simultaneously communicating information over a plurality of data links that reduces noise and other problems typically associated with simultaneously switched outputs.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

A method and apparatus for simultaneously communicating data over a plurality of data links, such as a bus, determines initial logic levels of data to the output on each of the plurality of data links and changes the logic levels, such as inverting the data, of at least some of the data to produce logic level adjusted data in response to determining the initial logic level of the data to reduce the number of transitions from one to zero or from zero to one. This can reduce switching noise associated with simultaneously outputting data over the plurality of data links.

Accordingly, in one example, a transmitting chip or circuit is prevented from sending a logic level "1" (or a logic level "0") for more than one half of the simultaneous switched outputs. For example, if a data transmitting chip or circuit is required to send logical "1s" (or logical "0s") for more than half of the simultaneously switched outputs, the process and includes changing, such as inverting, all of the data for all the outputs. For example, all logic level "1" outputs of a group of outputs would be inverted to logic level "0" and initial logic level "0" outputs would be inverted to logic level "1s". In such an instance, the method and apparatus prevents a situation where more than half the outputs are simultaneously switched. Any other suitable criteria other than a "more than one half" approach may also be used.

The method and apparatus also includes generating at least one logic level adjustment code bit indicating, for example, whether the output data is at the initial logic levels or is in a changed logic level (e.g., inverted or increase or decreased where multilevel logic is used). The logic level adjustment code bit may be communicated on a separate logic level adjustment code bit port and data link, or may be embedded in the data stream on one a plurality of data links used to output data, or otherwise provided to a receiving circuit. In one embodiment, the logic level adjustment code bit is a logical "1" or "0", wherein a logical "1" indicates that the data output on the simultaneous switched output is inverted. A receiving circuit readjusts the logic level adjusted data to an initial logic level, such as by again inverting the adjusted data to bring back to its original logic level. However, if no inversion occurred, the logic level adjustment code bit may be set to a logic "0" and the receiving circuit will do nothing to the logic levels of the received information. Accordingly, in the case of reversed signals, the receiving chip or circuitry inverts the input signals for further processing if the logic level adjustment code bit indicates that a logic level change occurred.

However, other coding schemes may be used. Depending upon a desired operation, the logic level adjustment code bit may stay high even after the data has not been inverted if the receiver is configured to wait until a change in bit state has occurred to determine whether to invert or not invert the received data. Other schemes will also be recognized by one of ordinary skill in the art.

Figure 2:
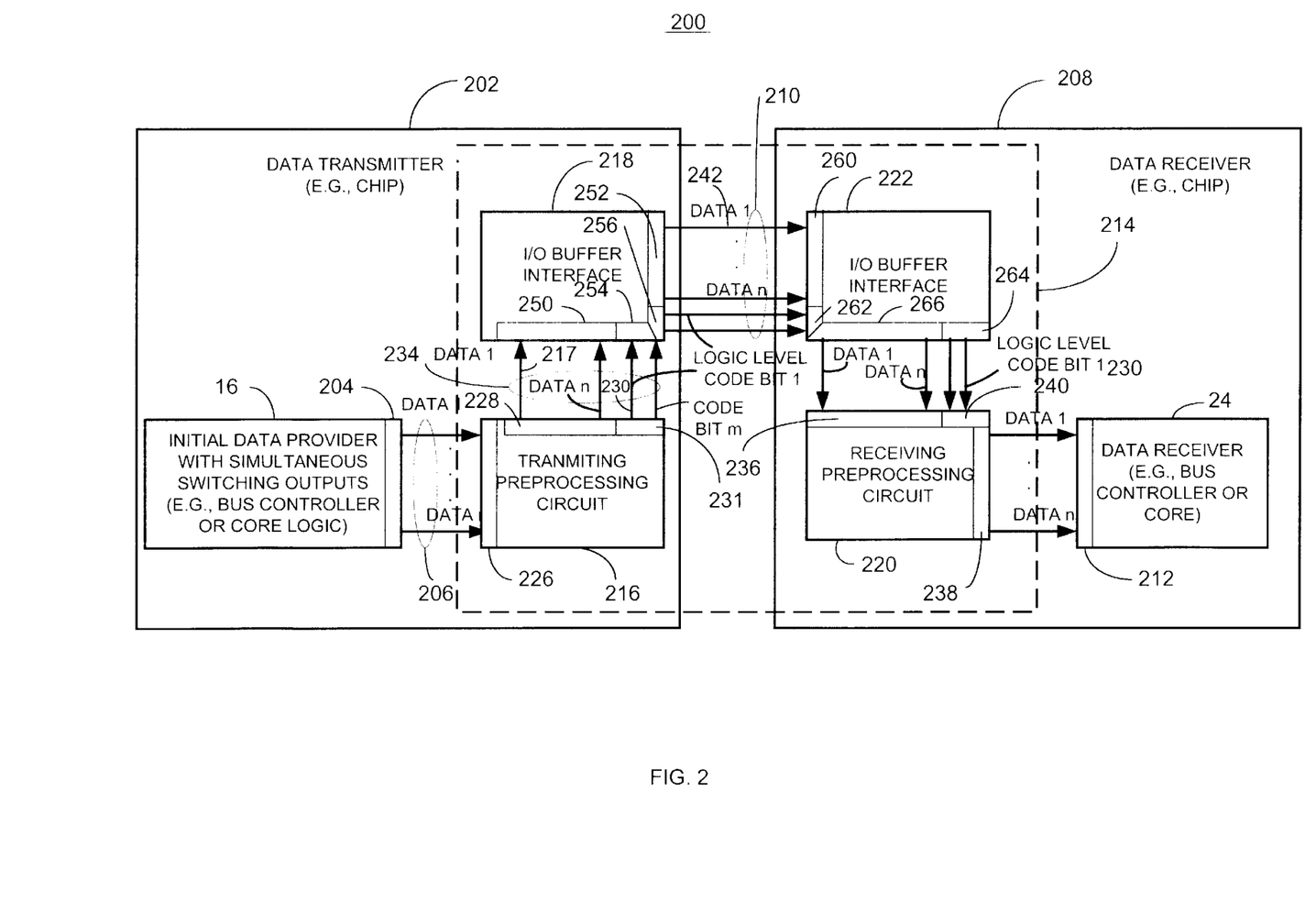
FIG. 2 is a block diagram illustrating one example of an apparatus for simultaneously outputting data over a plurality of data links in accordance with one embodiment of the invention.

FIG. 2 illustrates one example of a data communication system 200 in accordance with one embodiment of the invention. A data transmitting circuit 202 includes a data provider 16 that has simultaneous switching outputs indicated at 204. The simultaneous switching outputs output bits in parallel on each of a plurality of data links 206, such as a bus. The data communication system 200 also includes a data receiving circuit 208, such as another chip, circuit, or any other element that receives data over data links 210. The data receiving circuit 208 includes a data receiver 24, such a bus controller or any other suitable circuit. The data receiver has parallel input ports 212. The data communication system includes a data preprocessing circuit 214 that is operatively interposed between the data transmitting circuit 202 and the data receiving circuit 208 via the data bus 210. The data preprocessing circuit 214 includes a transmitting preprocessing circuit 216, a first I/O interface 218, such as an I/O buffer, a second I/O interface such as an I/O buffer interface 222 and a receiving processing circuit 220.

The data receiving circuit 208 includes the receiving preprocessing circuit 220 and the I/O buffer interface 222 operating in a receiving mode that receives at least one logic level adjustment code bit. For purposes of illustration, and not limitation, the invention will be described with reference the above configuration wherein the first I/O interface 218 is set in a transmit mode and the second I/O interface is set in a receive mode. However, it will be recognized that the data receiving circuit 208 will also serve as a data transmitting circuit in a bidirectional configuration and that the data transmitting circuit 202 may likewise serve as a data receiver by incorporating the receiving preprocessor circuit 220 and I/O buffer interface 218 operating in a receiving mode.

The transmitting preprocessing circuit 216 includes a plurality of parallel inputs 226, a plurality of parallel simultaneous switchable outputs 228 and a logic level adjustment code bit output port 231. The transmitting preprocessing circuit 216 also includes logic level changing circuitry operative to change, such as invert, logic levels of at least some parallel data received via the plurality of parallel inputs 216, to produce logic level adjusted data that is output via the plurality of simultaneously switched outputs 228 when too many of the outputs, such as more than one half, are an undesired same logic level (e.g., all "1"s). It will be recognized that where the logic is multilevel logic, the logic level changing circuitry may suitably increase or reduce the logic level to reduce switching noise. Where single level binary logic is used (e.g., "1" or "0"), the logic level changing circuitry may be, for example, inverter logic controlled in response to a logic level adjustment code bit as further described below. In addition, any other suitable combination of hardware, software, or firmware, may be used. The logic level changing circuitry changes the logic levels of received data in response to determining an initial logic level of the data received. The logic level changing circuitry also includes logic level adjustment code bit generating logic (see FIG. 3) operative to generate at least one logic level adjustment code bit 230.

The transmitting preprocessing circuitry 216 outputs the at least one logic level adjustment code bit in conjunction with simultaneously communicated logic level adjusted data via simultaneously switched output ports 228 over data link 234. In this example, the logic level adjustment code bit 230 is communicated on a separate data link from the simultaneously output logic level adjusted data. However, it will be recognized that the logic level code bit 230 may also be communicated over any of the data links to reduce the number of data links required. For example, the logic level code bit 230 may be communicated first over one of the simultaneously switched outputs whereafter the actual data is subsequently output over the simultaneously switched outputs 228. It will be recognized that the logic level adjustment code bit may provided to the receiving circuit in any suitable manner.

The receiving preprocessing circuit 220 includes a plurality of parallel inputs 236, a plurality of parallel simultaneous switchable outputs 238 and a logic level adjustment code bit input port 240. In addition, the receiving preprocessing circuit 220 also includes logic level readjustment circuitry (see FIG. 4) operative to change, such as invert or readjust a multilevel logic signal, logic levels of at least some of the parallel data 242 received via the parallel inputs 236 to produce initial logic level data. This readjusted data is output via a plurality of simultaneous switching outputs 238 to the data receiver 24 in response to at least one logic level adjustment code bit 230 received via the logic level adjustment code bit input port 240.

It will be recognized that the disclosed circuitry and functionality may be incorporated using hardware, software, firmware, or any suitable combination thereof. In addition functions and/or logic may be incorporated in any suitable portion of a transmitter or receiver. For example, the logic level readjustment circuitry may be incorporated as part of the I/O buffer 222 whereas the logic level changing circuitry may be incorporated as part of the I/O buffer 218.

The I/O buffer 218 includes a plurality of parallel inputs 250 coupled to the plurality of parallel simultaneous switchable outputs 228 via bus 234. The input/output buffer 218 includes a plurality of simultaneous switching outputs 252 for outputting data 242 on bus 210. The input output buffer 218 also includes a logic level adjustment code bit input port 254 that receives one or more code bits via one or more data links. The input output buffer 218 also includes logic level adjustment code bit output port 256 to output the one or more code bits for transmission to the receiver 208.

The I/O buffer 222 includes a plurality of parallel inputs 260, a logic level adjustment code bit input port 262 and a logic level adjustment code bit output port 264 along with a plurality of simultaneous switching outputs 266. Each of the ports and outputs may be the same conventional fast switching I/O buffer structures.

Figure 3:
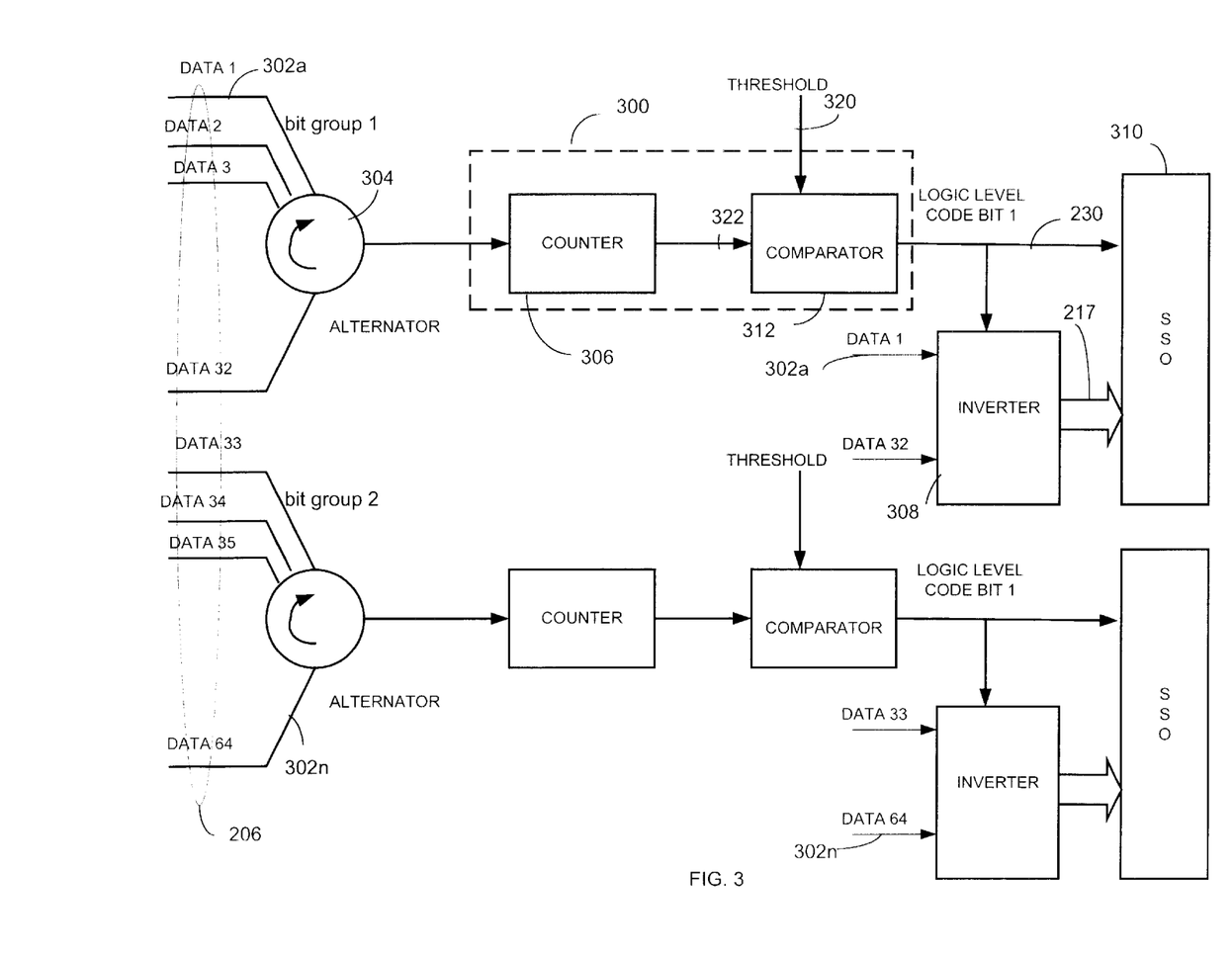
FIG. 3 is a block diagram illustrating one example of a data pre-processing circuit in accordance with one embodiment of the invention.
Figure 4:
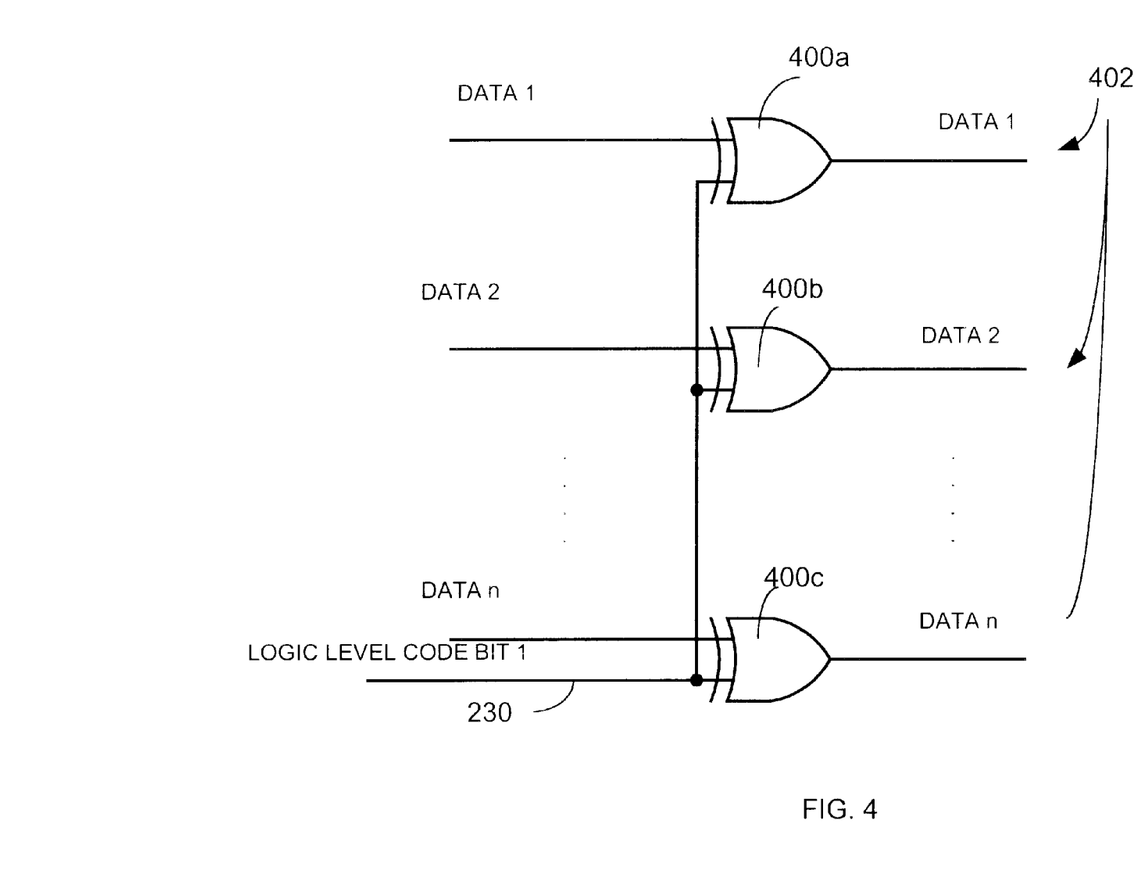
FIG. 4 is a circuit diagram illustrating one example of a receiving preprocessing circuit in accordance with one embodiment of the invention.

Referring to FIGS. 2–4, the transmitting preprocessing circuit 216 serves as a data preprocessing circuit that can be coupled to the initial data provider 16. The initial data provider 16 includes the plurality of parallel data outputs 204 associated with a plurality of corresponding data links 206, and provides initial data to the data preprocessing circuit through the plurality of parallel inputs 226. The data preprocessing circuit 216 is operative to change logic levels of at least some of the data from the parallel outputs 204 to produce logic level adjusted data 217 that is output on data links 234. The logic level adjusted data 217 is provided in response to determining the initial logic level of the initial data received over data links 206. The logic levels of the logic level adjusted data reduce the switching noise associated with the simultaneous outputting of data over the plurality of links 210 by the I/O buffer 218.

FIG. 3 illustrates one example of a logic level determining circuit 300 operative to determine initial logic levels of data 302a–302n received over data links 206. In this embodiment, the logic level determining circuit 300 includes an alternator 304 and a counter 306. The logic level determining circuit 300 determines initial logic levels of data to be output on each of the plurality of data links 234.

The data preprocessing circuit 216 also includes a logic level changing circuit 308, such as an inverting circuit operatively coupled to simultaneous switching outputs 310 and operatively coupled to a comparator 312. The logic level code bit 230 serves as a control signal to the inverter to invert the initial data 302a–302n when, for example, more than one half of the bits are logic 1 (or a logic "0"). The logic level changing circuit 308 changes a logic level of the data received from a plurality of data links 206 prior to a parallel data transfer over bus 210. The data preprocessing circuit 216 simultaneously outputs the logic level adjusted data 217 on the plurality of data links 234. The logic level adjustment code bit 230 is also, in this embodiment, output with the logic level adjusted data 217 through the logic level adjustment code bit output port 231. Accordingly, in this embodiment, the data processing circuit inverts parallel data associated with all of the data links 206 to produce the logic level adjusted data 217 based on a threshold 320. The threshold 320 is a threshold indicating an unacceptable number of parallel data bits that should not be at the same logic level. For example, the threshold 320 may be one bit more than half of the parallel data bits. By way of illustration, if the data links 210 is a 64-bit bus, parallel data may be grouped into groups of 32 bits. A threshold is set for each bit group. In this example, if a group is thirty two bits, the threshold may be set, for example, at seventeen bits. The alternator 304, which may be, for example, a multiplexing circuit, outputs data (e.g., bits) to the counter 306. The counter 306, for example, counts the number of logic "1s" that are present in the bit group and outputs the total number of "1s" as a number of initial data logic levels 322, to the comparator 312. The threshold 320 may be set, for example, at seventeen bits so that if seventeen bits of the 32 bit group are logic "1s", the comparator 312 will output a logic level adjustment code bit 230 equal to a logical 1 indicating that an inversion of all the data in the group is required by receiving preprocessing circuit. Conversely, if the number of common bit logic levels is below the threshold, then the comparator outputs a different control bit such as a "0" bit indicating that no inversion is necessary. The inverter 308 will suitably invert the data from the data group. Depending upon the size of the groups, which may be any suitable size, a plurality of alternators, counters, comparators and inverters may be used for each parallel data bit group. Accordingly, alternator 330, counter 332, comparator 334 and inverter 336 are shown for a second bit group 338.

In an alternative embodiment, the data preprocessing circuit may include one or more memory elements such as registers that store previously transmitted data. The data preprocessing circuit then performs first order preprocessing by comparing new data to be sent with previously stored data. If more than a predetermined number of bits are different between the previous bit group and the current bit group, the preprocessor inverts the bits in the bit group.

The counter 306 is operative to count parallel data bits 1–32 to obtain a value 322 for use by the comparator 312. The comparator 312 is operatively coupled to receive the value 322 and to compare the value 322 to the threshold value 320 to determine whether to indicate that a logic level change is needed by the receiving preprocessing circuit, namely through logic level code bit 230. The counter 306 determines the number of bit on data links having a logic "1" level, or, alternatively, a logic "0" level, if desired. However, any type of analyzer, other than a counter based analyzer may be used.

FIG. 4 illustrates one example of a portion of the receiving preprocessing circuit 220 that includes a plurality of XOR gates 400a–400c wherein at least one input thereof receives the logic level code bit 230. Another input at each of the XOR gates 400a–400c receives the transferred data 242 as provided by the I/O buffer 222. If the logic level code bit is a logic 1, for example, the exclusive or gates will invert the data to provide logic level adjusted data 402. However, if the logic level code bit is a logic 0 indicating that no inverting should occur, the exclusive ors do not invert the information. It will be recognized that the circuit of FIG. 4 and of the other circuits in the other FIGS. is only one example of a multitude of other circuits that can perform inversion operations and that any suitable logic in the form of hardware, software, firmware, or any suitable combination of hardware, software or firmware may be used.

Figure 5:
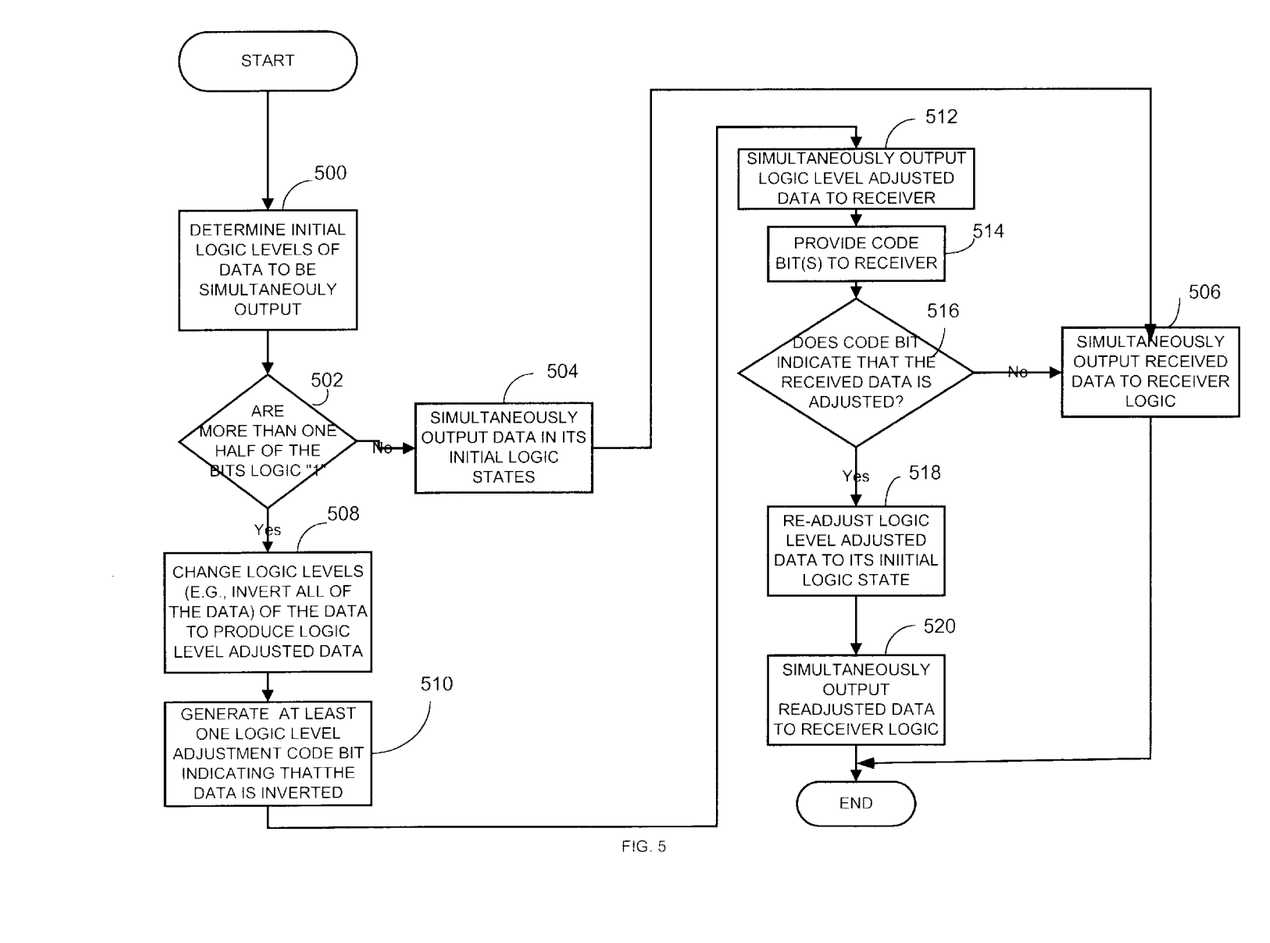
FIG. 5 is a flow chart illustrating one example of a method for simultaneously communicating data over a plurality of data links in accordance with one embodiment of the invention.

FIG. 5 illustrates one example of a method for simultaneously communicating data over a plurality of data links in accordance with one embodiment of the invention. As shown in block 500, the method includes determining initial logic levels of data to be simultaneously output. As shown in block 502, the method includes determining whether a logic level of a plurality of bits is the same as a predetermined number, such as a threshold value. For example, the method includes analyzing how many "1s" of a bit group (or how many zeros, if desired) of a bit group are present. Alternatively, an adder or any other operation could be used to analyze a number of bits in a bit group to indicate that a change in logic level should occur. If the number of "1s" does not exceed more than half of the bit group, (or if the number of zeros does not exceed more than half of the bit group), the process continues to block 504 where the method includes simultaneously outputting the data in its initial logic state. As shown in block 506, the method includes simultaneously outputting the received data to a data receiver or other suitable circuit, such as core logic in an integrated circuit.

Referring back to block 502, if more than, for example, one half, or any other suitable criteria, of the bits are logic 1 (or logic zero) the method includes changing the logic levels of at least some of the data to produce the logic level adjusted data as shown in block 508. This is done in response to determining the initial logic level of data, for example, as shown in block 500. In this example, all of the data is changed, such as inverted, to reduce the switching noise associated with the simultaneous outputting of data over a plurality of data links, such as over a plurality of lines on a bus. Accordingly, changing of the logic levels of at least some of the data may include inverting parallel data associated with all of the data links to produce the logic level adjusted data based on a threshold of an acceptable number of parallel data being at a same logic level as previously noted. For example, the threshold may be equal to more than one half of the total number of bits in a bit group, or any other suitable number.

For example, changing logic levels of at least some of the data may include changing the logic level on all of the plurality of data links prior to data transfer from the transmitter to the receiver. The data with the changed logic level simultaneously output so that the logic level adjusted data is transferred to the receiver on each of the plurality of data links. As shown in block 510, the method includes generating at least one logic level adjustment code bit indicating that the logic level of the data is changed, such as inverted or a level of the bit has been modified. As shown in block 512, the method includes outputting the at least one logic level adjustment code bit in association with the simultaneously communicated logic level adjusted data to a receiver. The logic level adjustment code bit or bits may be communicated, for example, before the simultaneously communicated logic level adjusted data is sent to a receiver where it may be, for example, temporarily stored by the receiver, or may be sent simultaneously with the simultaneously communicated logic level adjusted data on, for example, another data line or data link, or may be provided in any other suitable manner to a data receiver so that the data receiver can determine whether the received data has had its logic levels changed.

As shown in block 514, the method includes providing the code bit to the receiver. The method also includes receiving, for example by the receiving pre-processing circuit, the logic level adjusted data from the plurality of data links and at least one level adjustment code bit indicating that the initial data has been inverted or otherwise changed. This may be determined, for example, as shown in block 516 by determining whether the code bit indicates that the received data is adjusted. If the code bit indicates that the received data has not been adjusted, the process continues to block 506 where the data is output, for example, by the receiving preprocessing circuit, to the data receiver 24. As shown in block 518, if the code bit indicates that the received data has been adjusted, the process includes readjusting the logic level adjusted data to an initial logic level in response to receiving the at least one logic level adjustment code bit. The adjustment may be performed in any suitable manner including readjusting a level of a multilevel signal or inverting the group of data bits. Accordingly, it will be recognized that in one embodiment, there is a logic level adjustment code bit for each bit group. Readjusting the logic level adjusted data to an initial logic level may also include, for example, inverting the logic level adjusted data by performing an XOR operation with the at least one logic level adjusted code bit and received logic level adjusted data. As shown in block 520, the method then includes simultaneously outputting the readjusted data to a receiver logic.

Accordingly, the above disclosed method, apparatus and system can reduce switching noise for simultaneously switched outputs by, for example, never allowing more than half of the bits in any bit group to be switched.

It should be understood that the implementation of other variations and modifications of the invention in its various aspects will be apparent to those of ordinary skill in the art, and that the invention is not limited to the specific embodiments described. For example, the functions of the disclosed apparatus and method may be carried out by the bus controller, a CPU, or any other suitable device or combinations of devices. It is therefore contemplated to cover by the present invention, any and all modifications, variations, or equivalents that fall within the spirit and scope of the basic underlying principles disclosed and claimed herein.

What is claimed is:

1. A method for simultaneously communicating data over a plurality of data links comprising the steps of:
   determining initial logic levels of data to be output on each of the plurality of data links; and
   changing the logic levels of at least some of the data to produce logic level adjusted data in response to determining the initial logic level of the data without comparing the initial logic level to previously sent data, to reduce a number of switching transitions associated with simultaneously outputting data over the plurality of data links.

2. The method of claim 1 wherein the step of changing the logic levels of at least some of the data includes changing a logic level of the data on all of the plurality of data links prior to a parallel data transfer and wherein the method includes simultaneously outputting the logic level adjusted data on each the plurality of data links.

3. The method of claim 2 including the step of:
   generating at least one logic level adjustment code bit; and
   outputting the at least one logic level adjustment code bit associated with the simultaneously communicated logic level adjusted data.

4. The method of claim 3 wherein the step of outputting the at least one logic level adjustment code bit includes communicating the at least one logic level adjustment code bit on a separate data link from the simultaneously output logic level adjusted data.

5. The method of claim 1 including the step of:
   simultaneously outputting the logic level adjusted data on at least one of the plurality of data links on a group bit basis.

6. The method of claim 1 wherein the step of changing the logic levels of at least some of the data to produce logic level adjusted data includes inverting parallel data associated with all of the data links to produce the logic level adjusted data based on a threshold.

7. The method of claim 6 wherein the threshold indicates an unacceptable number of parallel data being at a same logic level wherein the same logic level is more than one half of a number of parallel bits.

8. The method of claim 6 including the step of receiving the logic level adjusted data from the plurality of data links and at least one logic level adjustment code bit indicating that the initial data has been inverted.

9. The method of claim 6 including the step of re-adjusting the logic level adjusted data to an initial logic level in response to receiving the at least one logic level adjustment code bit.

10. The method of claim 6 including the steps of:
    analyzing parallel data bits to obtain a value; and
    comparing the value to the threshold to determine a whether to change a logic level of a plurality of data bits.

11. The method of claim 9 wherein the step of readjusting the logic level adjusted data to an initial logic level includes the step of inverting the logic level adjusted data by performing an XOR operation with the at least one logic level adjustment code bit and received logic level adjusted data.

12. An apparatus for simultaneously outputting data over a plurality of data links comprising:
    a data preprocessing circuit, operatively coupleable to at least one initial data provider having a plurality of parallel data outputs associated with a plurality of corresponding first data links, the data preprocessing circuit having a plurality of parallel inputs operatively coupleable to the plurality of parallel data outputs, wherein the data preprocessing circuit is operative to change logic levels of at least some of the data from the parallel outputs to produce logic level adjusted data in response to determining the initial logic level of the data without comparing the initial logic level to previously sent data, reduce a number of switching transitions associated with simultaneously outputting data over the plurality of data links.

13. The apparatus of claim 12 wherein data preprocessing circuit includes a logic level determining circuit operative to determine initial logic levels of parallel data to be output on each of the plurality of corresponding data links.

14. The apparatus of claim 12 wherein the data preprocessing circuit includes a logic level changing circuit that changes a logic level of the data received from all of the plurality of first data links prior to a parallel data transfer and wherein the data preprocessing circuit includes second parallel outputs operatively coupleable to a second plurality of data links to simultaneously output the logic level adjusted data on each the second plurality of data links.

15. The apparatus of claim 13 wherein the data preprocessing circuit generates at least one logic level adjustment code bit; and outputs the at least one logic level adjustment code bit associated with the simultaneously communicated logic level adjusted data.

16. The apparatus of claim 15 wherein the data preprocessing circuit communicates the at least one logic level adjustment code bit on a separate data link from the simultaneously output logic level adjusted data.

17. The apparatus of claim 15 wherein the data preprocessing circuit communicates the at least one logic level adjustment code bit on a same data link used to communicate the simultaneously output logic level adjusted data.

18. The apparatus of claim 12 wherein the data preprocessing circuit inverts parallel data associated with all of the data links to produce the logic level adjusted data based on a threshold.

19. The method of claim 17 wherein the threshold indicates an unacceptable number of parallel data being at a same logic level wherein the same logic level is more than one half of a number of parallel bits.

20. The apparatus of claim 17 including a receiving preprocessing circuit operatively coupled to receive the logic level adjusted data from the plurality of data links and to receive at least one logic level adjustment code bit indicating that the initial data has been inverted.

21. The apparatus of claim 19 wherein the receiving preprocessing circuit re-adjusts the logic level adjusted data to an initial logic level in response to receiving the at least one logic level adjustment code bit.

22. The apparatus of claim 17 wherein the data preprocessing circuit includes an analyzer operative to analyze parallel data bits to obtain a value; and a comparator circuit operatively coupled to the analyzer, to compare the value to a threshold to a whether to change a logic level of a plurality of data bits.

23. The apparatus of claim 20 wherein the receiving preprocessing circuit re-adjusts the logic level adjusted data to an initial logic level and includes an XOR circuit operative to inverting the logic level adjusted data by performing an XOR operation with the at least one logic level adjustment code bit and received logic level adjusted data.

24. A data pre-processing circuit comprising:
a plurality of first parallel inputs;
a plurality of first parallel simultaneous switchable outputs (SSO);
a logic level changing circuitry operative to change logic levels of at least some of parallel data received via the plurality of first parallel inputs to produce logic level adjusted data that is output via the plurality of SSO, in response to determining an initial logic level of data without comparing the initial logic level to previously sent data, received via the plurality of first parallel inputs; and logic level adjustment code bit generating logic operative to generate at least one logic level adjustment code bit and to output the at least one logic level adjustment code bit associated with simultaneously communicated logic level adjusted data that is output via the plurality of first SSO.

25. The circuit of claim 24 including at least one logic level adjustment code bit output port.

26. The circuit of claim 24 including an input/output buffer having:
a plurality of second parallel inputs operatively coupled to the plurality of parallel simultaneous switchable outputs;
a plurality of second parallel simultaneous switching outputs wherein at least one of the parallel simultaneous switching outputs communicates a logic level adjustment code bit.

27. The circuit of claim 24 including a counter operative to count parallel data bits to obtain a value; and a comparator circuit operatively coupled to the counter, to compare the value to a threshold value to determine a whether to change a logic level of a plurality of data bits.

28. A data pre-processing circuit comprising:
a plurality of parallel inputs;
a plurality of parallel simultaneous switchable outputs (SSO); and
logic level re-adjustment circuitry operative to change logic levels of at least some of parallel data received via the plurality of parallel inputs without comparing the initial logic level to previously sent data, to produce initial logic level data that is output via the plurality of SSO, in response to at least one logic level adjustment code bit received via the at least one logic level adjustment code bit input port.

29. The circuit of claim 28 including at least one logic level adjustment code bit input port.

30. The circuit of claim 28 wherein the logic level re-adjustment circuitry includes an inverter circuit operatively coupled to invert received data to bring the received data to an initial logic state.

31. A data communication system comprising:
a data transmitting circuit including a data provider having simultaneous switching outputs;
a data receiving circuit including a data receiver having parallel input ports; and
a data preprocessing circuit, operatively interposed between the data transmitting circuit and the data receiving circuit via a data bus, having:
(a) a transmitting preprocessing circuit that includes:
a first plurality of parallel inputs;
a first plurality of parallel simultaneous switchable outputs (SSO);
at least one logic level adjustment code bit output port;
logic level changing circuitry operative to change logic levels of at least some of parallel data received via the plurality of first parallel inputs to produce logic level adjusted data that is output via the plurality of first SSO, in response to determining an initial logic level of data received without comparing the initial logic level to previously sent data, and includes logic level adjustment code bit generating logic operative to generate at least one logic level adjustment code bit and to output the at least one logic level adjustment code bit associated with simultaneously communicated logic level adjusted data that is output via the plurality of first SSO; and (b) a receiving preprocessing circuit that includes:
  a plurality of second parallel inputs;
  a plurality of second parallel simultaneous switchable outputs (SSO);
  at least one logic level adjustment code bit input port; and
  logic level re-adjustment circuitry operative to change logic levels of at least some of parallel data received via the plurality of second parallel inputs to produce initial logic level data that is output via the plurality of second SSO, in response to at least one logic level adjustment code bit received via the at least one logic level adjustment code bit input port.

32. The circuit of claim 31 wherein the logic level re-adjustment circuitry includes an inverter circuit operatively coupled to invert received data to bring the received data to an initial logic state.

* * * * *